United States Patent Office 3,480,580
Patented Nov. 25, 1969

3,480,580
MODIFIED POLYMERS
Frederick B. Joyner and Richard L. McConnell, Kingsport, Tenn., assignors to Eastman Kodak Company, Rochester, N.Y., a corporation of New Jersey
No Drawing. Filed Oct. 22, 1965, Ser. No. 502,437
Int. Cl. C08f 27/00, 27/28
U.S. Cl. 260—29.6                                  17 Claims

ABSTRACT OF THE DISCLOSURE

A process for making emulsifiable polyolefins by reacting thermally degraded polypropylene and higher alpha-olefins with an unsaturated polycarboxylic compound in the presence of a free radical source.

---

This invention relates to modified poly-α-olefin polymers having improved physical properties and the process for preparation thereof. One of the aspects of this invention concerns a novel process for preparing emulsifiable low molecular weight poly-α-olefin compositions. Another aspect of this invention concerns the novel reaction product prepared by reacting low viscosity poly-α-olefins and unsaturated polycarboxylic compounds in the presence of a free radical source.

It is known in the art to react poly-α-olefin compounds with polycarboxylic compounds. However, the teachings of the prior art are directed to forming higher molecular weight materials which may be more readily fabricated into shaped articles. These shaped articles may then be crosslinked under relatively mild conditions into high molecular weight plastics which are tougher than the uncured plastics. One such prior art teaching is directed to forming high molecular weight polyethylene compositions by reacting polyethylene having a density of from .91 to about .96 with maleic anhydride. These compositions have a higher molecular weight and are less soluble than the unmodified polymeric material. Such prior art teachings therefore are directed to forming higher molecular weight polyethylenes having low softening points.

Accordingly, it is one of the objects of the invention to provide a novel process for preparing poly-α-olefin compositions having improved physical properties.

Another object of this invention is to provide poly-α-olefin compositions having high softening points.

A further object of the invention is to provide an emulsifiable poly-α-olefin composition.

Still another object of the invention is to prepare low molecular weight crystallizable poly-α-olefin compositions exhibiting high hardness properties.

A still further object of this invention is to improve the emulsifiability of unemulsifiable poly-α-olefin compositions by reacting the unemulsifiable compound with unsaturated polycarboxylic compounds.

Another object is to provide a process for producing poly-α-olefin compounds having good color and are readily emulsifiable.

A further object is to provide poly-α-olefin emulsions which are clear and stable.

Another and still further object of this invention is to provide a low temperature process for preparing emulsifiable poly-α-olefin compositions without a substantial loss of maleic anhydride by degradation and formation of charred maleic anhydride.

Further objects and advantages of the invention will be apparent to those skilled in the art from the accompanying disclosure and claims.

In accordance with this invention, it has been found that low viscosity homopolymers of alpha-monoolefins containing 3 to 12 carbon atoms, and copolymers thereof, can be modified to produce polymers having improved physical and chemical properties by treating such homopolymers, or copolymers, with organic unsaturated polycarboxylic acids, acid anhydrides and acid esters derived therefrom in the presence of a free radical source. These modified polymeric materials are of low molecular weight and emulsifiable in both nonionic and anionic emulsification systems.

One aspect of this invention therefore is a novel process for preparing novel emulsifiable poly-α-olefin compositions of monoolefins containing at least 3 carbon atoms. Low viscosity homopolymers and copolymers of propylene, butene-1, 4-methyl-1-pentene, 3-methyl-1-butene, 4,4-dimethyl-1-pentene, 3-methyl pentene-1, 4-methyl hexene-1, 5-ethyl hexene-1, 6-methyl heptene-1, hexene-1, heptene-1, octene-1, nonene-1, decene-1, and dodecene-1 and the like have been found to produce novel compositions when reacted with unsaturated organic polycarboxylic acids, anhydrides, or acid esters derived therefrom, as more fully described hereinafter.

The novel emulsifiable poly-α-olefin compositions of this invention are prepared by reacting low viscosity poly-α-olefins of the monoolefins containing at least 3 carbon atoms with an unsaturated polycarboxylic acid, anhydrides or esters thereof in the presence of a free radical source. These homopolymeric or copolymeric low viscosity poly-α-olefins are prepared by thermally degrading conventional high molecular weight α-olefin polymers prepared by conventional polymerization processes. For example, one such suitable conventional polymer is the highly crystalline polypropylene prepared according to U.S. Patent 2,969,345. Thermal degradation of conventional homopolymers or copolymers is accomplished by heating them at elevated temperatures causing the polymer chain to rupture apparently at the points of chain branching of the polymeric material. The degree of degradation is controlled by reaction time and temperature to give a thermally degraded low molecular weight crystallizable polymeric material having a melt viscosity range from about 100–5,000 cp. at 190° C. (ASTM–D1238–57T using .04±.0002 inch orifice) and an inherent viscosity of about .1 to .5 [Schulken and Sparks, Journal Polymer Science 26, 227, (1957)]. By carefully controlling the time, temperature and agitation, a thermally degraded poly-α-olefin of relatively narrower molecular weight range than the starting high molecular weight polymer in obtained. The degradation is carried out at a temperature from 290° C. to about 425° C. These low viscosity poly-α-olefins prepared by thermally degrading conventional high molecular weight polymers are not emulsifiable as such, but upon reacting them with unsaturated polycarboxylic acids, anhydrides or esters thereof, thereby increasing the acid number and saponification number of the thermally degraded polymer, become emulsifiable.

The low viscosity poly-α-olefins which are useful for purposes of this invention are characterized by having a melt viscosity of less than about 100 to 5,000 cp. as measured at 190° C. (ASTM–D1238–57T using .04±.0002 inch orifice). These low viscosity poly-α-olefins are reacted with unsaturated polycarboxylic acids, anhydrides or esters thereof at temperatures generally less than 300° C., preferably from about 150–250° C. in the presence of free radical sources. Suitable free radical sources are, for example, peroxides such as ditertiary butyl peroxide, tertiary butyl hydroperoxide, cumene hydroperoxide, p-menthane peroxide, p-menthane hydroperoxide compounds or azo compounds, such as azobis (isobutyronitrile), or irradiation sources. Suitable irradiation sources include, for example, those from cobalt, uranium, thorium, and the like and ultraviolet light. Preferably, about 1 to 10% organic unsaturated polycarboxylic acid, anhydride or esters thereof, based on the weight of the low viscosity polyolefin, can be used in the invention. The amount of peroxide or free radical agent used is generally quite low being of the order of about .01 to about .5% based on the weight of the low viscosity poly-α-olefin. The reaction may be carried out either in a batchwise or in a continuous manner with contact times in the order of about 10 minutes to about 2 hours. Suitable unsaturated polycarboxylic acids and anhydrides are, for example, maleic acid, maleic anhydride, fumaric acid, citraconic anhydride, aconitic anhydride and itaconic anhydride. Suitable esters are, for example, the half or full esters derived from methyl, ethyl, dimethyl maleate, dimethyl fumarate, methyl ethyl maleate, dibutyl maleate, dipropyl maleate, and the like, or those compounds which form these compounds at elevated reaction temperatures such as citric acid, for example. These modified low molecular weight poly-α-olefin compositions have a melt viscosity of 100–5,000 centipoise at 190° C. and a saponification number of at least 6, preferably about 7–30. It has been observed in the present invention that the melt viscosity of the product increases slightly. This increase in melt viscosity may be due to a slight degree of crosslinking or to copolymerization of the wax material with maleic anhydride.

One method for the determination of saponification number of maleated polypropylene is as follows: Weigh approximately 4 g. of the sample into a 500 ml. alkali-resistant Erlenmeyer flask and add 100 ml. distilled xylene. Heat under a reflux condenser for 1 hour. Cool the solution to 75° C. or less, and add from a buret 30 ml. standardized .10 N KOH in ethyl alcohol. Heat under reflux for 45 min. Cool, and add from a buret standardized .10 N CH$_3$COOH in xylene until the mixture is acid to phenolphthalein. Add at least 1 ml. excess CH$_3$COOH. Reheat the solution under reflux for 15 min. Remove from heat, add 5 ml. water, and titrate to a faint pink end point with .10 N KOH in ethyl alcohol. Run a blank in this manner using the same amounts of reagents and the same heating times.

Calculation:

$$\frac{[(\text{ml. KOH} \times \text{N}) - (\text{ml. CH}_3\text{COOH} \times \text{N})] - }{\text{g. Sample}}$$
$$\frac{[(\text{ml. KOH} \times \text{N}) - (\text{ml. CH}_3\text{COOH} \times \text{N})] \times 56.1}{\text{g. Sample}} = \text{Sap. No.}$$

The unreacted, unsaturated polycarboxylic acid can be separated from the reaction mixture by purging the reaction mixture with an inert gas while the melt temperature is between 200 and 300° C. After the unreacted unsaturated polycarboxylic acid has been removed, the modified poly-α-olefin can be further purified by vacuum stripping, solvent extraction, or dissolving in an aqueous medium and isolated by removing the solvent or water.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

The low viscosity poly-α-olefins can be prepared by thermally degrading high molecular weight polymer having an I.V. greater than .5. One such thermal degradation process is carried out by placing in a glass, round-bottomed flask about 250 g. of 90/10 propylene/1-butene copolymer having an I.V. of 1.9. The flask was purged with dry nitrogen to remove air and it was carefully immersed in a Wood's metal bath maintained at 350° C. After the polymer melted, it was stirred and maintained at 350° C. for 1 hour. The flask was removed from the metal bath. After the polymer had cooled to 200° C., it was poured from the flask onto a metal tray. The product had a melt viscosity of 1500 cp. at 190° C. and an inherent viscosity of .27.

EXAMPLE 2

About 250 grams of highly crystallizable high molecular weight polypropylene having a heptane index of greater than 95%, and an inherent viscosity of about 2.0 was placed in a glass round-bottomed flask. The flask was purged with dry nitrogen to remove air and it was carefully immersed in a Wood's metal bath maintained at 350° C. After the polymer melted, it was stirred and maintained at 350° C. for about 1 hour. The flask was removed from the metal bath. After the polymer had cooled to about 200° C., it was poured from the flask onto a metal tray. On cooling to about ambient temperature, the hard brittle waxy material was easily granulated and had a melt viscosity of about 3,300 centipoise at 190° C. and an inherent viscosity of about .42.

Low viscosity polymers were also produced in the above manner from high molecular weight poly-1-butene, poly-1-pentene, poly-1-hexene, poly-4-methyl-1-pentene and poly-1-dodecene.

EXAMPLE 3

Low-viscosity polypropylene (150 g.) having a melt viscosity of 500 cp. at 190° C. and 7.5 g. of maleic anhydride were placed in a 500 ml., three-necked flask fitted with a metal sweep stirrer, a dropping funnel, and a steam-jacketed condenser to return maleic anhydride which boiled out of the reaction mixture. The flask was lowered into a metal bath whose temperature was controlled at 200° C. After the mixture had melted down, it was stirred and di-t-butyl peroxide (.38 g.) dissolved in 10 ml. of dry heptane was added dropwise from the dropping funnel to the reaction mixture with stirring. About 30 minutes were required to add all of the di-t-butyl peroxide solution in this manner. The reaction mixture was stirred for an additional 30 minutes at 200° C. At the end of this time, the flask was removed from the metal bath and poured into a metal tray. The product was a very light-colored material with no apparent black specks or discolored products in it. The melt viscosity of the final product was 730 cp. at 190° C. The extracted saponification number of the product was 20 and it gave good emulsions with both anionic and nonionic emulsification systems.

EXAMPLE 4

About 125 grams of low viscosity polypropylene of 3,300 centipoise at 190° C. and 7.5 grams of maleic anhydride were placed in a 500 ml. glass, round-bottom flask similar to that described in Example 3. The reaction mixture was heated and stirred at 200° C. for about 1 hour. The product was poured from the flask onto a metal tray. The waxy product had a melt viscosity of 3,600 centipoise at 190° C. and a saponification number of 16.

Low viscosity polymers were also produced in the above manner from low-molecular-weight 50/50 propylene/1-butene copolymer, 95/5 propylene/1-pentene copolymer, 90/10 propylene/1-hexene copolymer, 80/20 propylene/4-methyl-1-pentene copolymer, 75/25 propylene/1-dodecene copolymer and 90/10 1-butene/hexene copolymer.

EXAMPLE 5

A total of 150 g. of low-viscosity polypropylene having a melt viscosity of 500 cp. at 190° C. and 7.5 grams of maleic anhydride were placed in a 500 ml. flask similar to that described in Example 3. The reaction mixture was heated and stirred at 300° C. for a period of 1 hour. The product obtained was dark brown and there were many dark, black specks throughout the product. These black specks were produced by the thermal degradation of the maleic anhydride. The melt viscosity of the product was 250 cp. at 190° C. and the extracted saponification number was 8.5. Emulsions made from this thermally maleated product were quite dark and unacceptable for the treatment of fabrics or for floor waxes.

EXAMPLE 6

Low-viscosity polypropylene having a melt viscosity of 3,000 cp. at 190° C. was maleated with maleic anhydride according to the general procedure of Example 3 except that cumene peroxide was used instead of di-t-butyl peroxide and the reaction time was 2 hours instead of 1 hour. The product was a light cream colored material having a melt viscosity of 3,300 cp. at 190° C. and extracted saponification number of 15. It produced excellent emulsions with both anionic and nonionic emulsification systems.

EXAMPLE 7

A 90/10 propylene/1-butene copolymer having a melt viscosity of 1,000 cp. at 190° C. was maleated with maleic anhydride according to the general procedure of Example 3 except that the reaction was conducted for a period of 30 minutes. The final product was a very light cream color having a melt viscosity of 1,200 cp. at 190° C. and extracted saponification number of 18.8. Similarly good results were obtained using 95/5, 80/20, and 50/50 propylene/1-butene copolymers as described above.

EXAMPLE 8

Low-viscosity polypropylene (400 cp. at 190° C.) was maleated according to the general procedure of Example 3 except that dimethyl maleate was used as the maleating agent instead of maleic anhydride. Also, it was necessary to use a water-jacketed reflux condenser rather than the steam-jacket condenser in order to keep the dimethyl maleate in the reaction mixture. The product was a white powder having a melt viscosity of 650 cp. at 190° C. Similarly good results were obtained with dimethyl fumarate, the monomethyl ester of maleic acid, the monomethyl ester of fumaric acid, the dibutyl ester of maleic acid and the diethyl ester of fumaric acid.

EXAMPLE 9

Low-viscosity polypropylene was treated with itaconic anhydride according to the general procedure of Example 3. The product was very light in color and emulsified well. Its extracted saponification number was 17.5. Similarly good results were obtained using citraconic anhydride instead of itaconic anhydride.

EXAMPLE 10

A 90/10 propylene/4-methyl-1-pentene copolymer having a melt viscosity of 800 cp. at 190° C. was maleated according to the procedure of Example 3 except that the reaction temperature was 175° C. The product was white and had a saponification number of 19. Its melt viscosity was 900 cp. at 190° C.

EXAMPLE 11

A 75/25 propylene-1-dodecene copolymer having a melt viscosity of 1,500 cp. at 190° C. was maleated according to the procedure of Example 3 except that the reaction was conducted at 225° C. The product was cream colored, had a melt viscosity of 1,800 cp. and an extracted saponification number of 21.7. It emulsified quite well.

EXAMPLE 12

A low-viscosity 95/5 propylene1/-pentene copolymer having a melt viscosity of 750 cp. at 190° C. was maleated according to the procedure of Example 3. The product was white, had a melt viscosity of 800 cp. at 190° C., and extracted saponification number of 19.5, and it emulsified quite well.

EXAMPLE 13

Emulsification of maleated polypropylene at atmospheric pressure

Ten g. of maleated polypropylene prepared as described in Example 3, 30 g. of Durmont E (esterfied Montan wax), and 7 g. of Acintol FA-3 (a tall oil fatty acid) were mixed and heated in a beaker to 155 to 160° C. with stirring. After cooling the mixture to 145° C., 7 g. of 2-amino-2-methylpropanol was added with stirring. Then the molten wax mixture was carefully added to 200 g. of water with good mechanical stirring. An excellent translucent emulsion was obtained which did not separate on standing.

Similarly good emulsions were obtained when a maleated propylene/1-butene copolymer prepared as described in Example 7 was used instead of the maleated polypropylene. No emulsion was obtained with low-viscosity polypropylene was used instead of the maleated polypropylene wax.

EXAMPLE 14

Emulsification of maleated polypropylene under pressure

One hundred g. of maleated polypropylene (730 cp. at 190° C.) prepared according to Example 3, 100 g. of Epolene E10, 50 g. of Tergitol NPX, 4 g. of potassium hydroxide, and 125 g. of water was placed in a 2-liter Parr stirred autoclave and the mixture was heated to 160 to 165° C. with stirring. The pressure inside the autoclave was 100 to 150 p.s.i. After 15 minutes at 160 to 165° C., the mixture was cooled to about 120° C., thereby decreasing the pressure to about 50 p.s.i. Additional water was added to dilute the emulsion to about 25% solids and it was heated back to 160 to 165° C. for 5 to 10 minutes with stirring. The emulsion was translucent and did not separate on standing. It is an excellent emulsion for treating permanently creased cotton fabrics and greatly improves the scuff resistance of these fabrics.

EXAMPLE 15

Emulsification of maleated polypropylene under pressure

A pressure emulsion was prepared according to the general procedure of Example 14 using 100 g. of maleated polypropylene (730 cp. at 190° C.), 100 g. of Epolene E, 35 g. of Acintol FA-3, 30 g. of 2-amino-2-methylpropanol, and 125 g. of water with subsequent dilution to 25% solids. This translucent emulsion when mixed with acrylic polymer hardening agent and leveling resin is an excellent floor polish which dries to give a hard, scuff-resistant, glossy surface.

EXAMPLE 16

Continuous preparation of maleated polypropylene

Low-viscosity polypropylene (500 cp. at 190° C.) maleic anhydride, and a 10% solution of di-t-butyl peroxide in mineral spirits were fed continuously in separate streams into the bottom of a stirred, stainless steel reactor. The concentrations of maleic anhydride and peroxide maintained in the reactor were 2.5% and 0.1%, respectively, based on the weight of low-viscosity polypropylene. The melt temperature was maintained at 200° C. and the contact time was 25 minutes. Product was removed continuously from the top of the reactor at the rate of 20 lb. per hour. The molten product was stripped under vacuum to remove volatiles, quenched in a water trough, and granulated. The light cream colored product had an extracted saponification number of 21 and it emulsified well by the procedures described in Examples 13 and 14.

As described hereinabove, this invention consists of a novel process and a new and novel modified low molecular weight poly-α-olefin polymeric composition which comprises reacting low viscosity polymers prepared from monoolefins having at least 3 carbon atoms with an unsaturated polycarboxylic acid, anhydride or ester thereof to prepare an emulsifiable modified poly-α-olefin having a melt viscosity of 100–5,000 centipoise at 190° C. and a saponification number of at least 6, preferably 7–30.

It was completely unexpected that a process as disclosed in the present application would be operable to provide emulsifiable low molecular weight polymeric materials since reacting polyethylene waxes, or low viscosity polyethylene with maleic anhydride in the presence of a free radical component, such as a peroxide, produces an insoluble and unemulsifiable crosslinked product. Moreover, reacting monomeric olefinic materials such as 1-octene with maleic anhydride in the presence of a peroxide forms alternating copolymers.

The modified low molecular weight poly-α-olefin compositions of this invention are useful for many purposes including preparing nonionic and anionic emulsions which are excellent textile-treating agents which improve the scuff resistance of fabrics such as permanently creased cotton fabrics. The emulsions are also useful in floor polish compositions providing scuff resistant, hard, glossy finishes.

The invention has been described in considerable detail with particular reference to preferred embodiments thereof, but it will be understood that variations and modifications can be effected within the spirit and scope of the invention as described hereinabove and as defined in the appended claims.

We claim:

1. A process for the preparation of an emulsifiable modified poly-α-olefin composition which comprises thermally degrading highly crystallizable poly-α-olefin compositions having an inherent viscosity greater than 0.5 prepared by polymerizing α-olefins having 3–12 carbon atoms, and reacting said thermally degraded polymers having an inherent viscosity of less than 0.5 with a member of the group consisting of unsaturated polycarboxylic acids, unsaturated polycarboxylic acid anhydrides and unsaturated polycarboxylic acid lower alkyl esters at a temperature from 150° to 300° C. in the presence of a free radical source to produce modified poly-α-olefin having a saponification number of at least 6, a melt viscosity of 100–5,000 centipoise at 190° C. and an inherent viscosity of less than about 0.5.

2. A process for the preparation of an emulsifiable low molecular weight modified poly-α-olefin which comprises thermally degrading high molecular weight crystallizable poly-α-olefin polymer, said polymer having an inherent viscosity of about 0.5 to about 7.0 prepared from α-olefins having 3–12 carbon atoms, at a temperature of 290–425° C. to prepare a low molecular weight crystallizable poly-α-olefin having an inherent viscosity of about .1 to .5, and reacting said thermally degraded poly-α-olefin with a member of the group consisting of unsaturated polycarboxylic acid, unsaturated polycarboxylic acid anhydrides and unsaturated polycarboxylic acid lower alkyl esters at a temperature from 150° to 300° C. in the presence of a free radical source to produce modified poly-α-olefin having a saponification number of at least 6, a melt viscosity of 100–5,000 centipoise at 190° C. and an inherent viscosity of less than about 0.5.

3. A process for the prepartion of an emulsifiable low molecular weight modified poly-α-olefin composition which comprises thermally degrading high molecular weight crystallizable homopolymeric composition prepared from α-olefins having 3–12 carbon atoms and having an inherent viscosity of about 0.5 to about 7.0 at a temperature of 290–425° C. to produce a low molecular weight crystallizable poly-α-olefin having an inherent viscosity of about .2 to about .5, and reacting said thermally degraded poly-α-olefin with a member of the group consisting of unsaturated polycarboxylic acids, unsaturated polycarboxylic acid anhydrides and unsaturated polycarboxylic acid lower alkyl esters at a temperature of 150 to 250° C. in the presence of a free radical source to produce modified poly-α-olefin having a saponification number of at least 6, a melt viscosity of 100–5,000 centipoise at 190° C. and an inherent viscosity of about .1 to about .6.

4. A process for the preparation of an emulsifiable low molecular weight modified poly-α-olefin composition which comprises thermally degrading high molecular weight crystallizable copolymeric compositions prepared from α-olefins having 3–12 carbon atoms and having an inherent viscosity of about 0.5 to about 7.0 at a temperature of 290–425° C. to produce a low molecular weight crystallizable thermally degraded poly-α-olefin having an inherent viscosity of about .1 to about .5, and reacting said thermally degraded poly-α-olefin with a member of the group consisting of unsaturated polycarboxylic acids, unsaturated polycarboxylic acid anhydrides and unsaturated polycarboxylic acid lower alkyl esters at a temperature of 150 to 250° C. in the presence of a free radical source to produce modified poly-α-olefin having a saponification number of at least 6, a melt viscosity of 100–5,000 centipoise at 190° C. and an inherent viscosity of about .1 to about .6.

5. A process for the preparation of an emulsifiable low molecular weight modified polypropylene composition which comprises thermally degrading high molecular weight crystallizable polypropylene having an inherent viscosity of about 0.5 to about 7.0 at a temperature of 290–425° C. to prepare a low molecular weight crystallizable thermally degraded polypropylene having an inherent viscosity of about .1 to about .5, and reacting said thermally degraded polypropylene with a member of the group consisting of unsaturated polycarboxylic acids, unsaturated polycarboxylic acid anhydrides and unsaturated polycarboxylic acid lower alkyl esters at a temperature of about 150–250° C. in the presence of an organic peroxide to produce modified poly-α-olefin having a saponification number of at least 6, a melt viscosity of 100–5,000 centipoise at 190° C. and an inherent viscosity of about .1 to about .6.

6. A process for the preparation of an emulsifiable low molecular weight propylene/butene-1 composition which comprises thermally degrading high molecular weight crystallizable propylene/butene-1 composition having an inherent viscosity of about 0.5 to about 7.0 at a temperature of 290–425° C. to prepare a low molecular weight crystallizable thermally degraded propylene/butene-1 composition having an inherent viscosity of about .1 to about .5, and reacting said thermally degraded propylene/butene-1 composition with a member of the group consisting of unsaturated polycarboxylic acids, unsaturated polycarboxylic acid anhydrides and unsaturated polycarboxylic acid lower alkyl esters at a temperature of about 150–250° C. in the presence of organic peroxide to produce modified propylene/butene-1 composition having a saponification number of at least 6, a melt viscosity of 100–5,000 centipoise at 190° C. and an inherent viscosity of about .1 to about .6.

7. An emulsifiable low molecular weight crystallizable modified polypropylene composition prepared by reacting a thermally modified poly-α-olefin composition according to the process of claim 5.

8. An emulsifiable low molecular weight crystallizable modified propylene/butene-1 copolymer composition prepared by reacting a thermally modified poly-α-olefin composition according to the process of claim 6.

9. A process for the preparation of an emulsifiable low molecular weight crystallizable modified poly-α-olefin composition which comprises reacting a thermally degraded poly-α-olefin composition having an inherent viscosity of about .1 to about .5 prepared from polymerizable α-olefins containing 3–1 carbon atoms with a member of the group consisting of unsaturated polycarboxylic acids, unsaturated polycarboxylic acid anhydrides and unsaturated polycarboxylic acid lower alkyl esters at a temperature of from 150° to 300° C. in the presence of a free radical source to produce modified poly-α-olefin having a saponification number of at least 6, a melt viscosity of 100–5,000 centipoise at 190° C. and an inherent viscosity of about .1 to about .6.

10. A process for the preparation of an emulsifiable low molecular weight crystallizable modified homopolymeric composition which comprises reacting a thermally degraded homopolymeric composition having an inherent viscosity of 0.5 to about 7.0 with a member of the group consisting of unsaturated polycarboxylic acids, unsaturated polycarboxylic acid anhydrides and unsaturated polycarboxylic acid lower alkyl esters at a temperature of from 150° to 300° C. in the presence of a free radical source to produce modified poly-α-olefin having a saponification number of at least 6, a melt viscosity of 100–5,000 centipoise at 190° C. and an inherent viscosity of about .1 to about .6.

11. A process for the preparation of an emulsifiable low molecular weight crystallizable copolymeric composition which comprises reacting a thermally degraded copolymeric composition having an inherent viscosity of about .1 to about .5 prepared by polymerizing α-olefins containing 3–12 carbon atoms to an inherent viscosity of 0.5 to 7.0 with a member of the group consisting of unsaturated polycarboxylic acids, unsaturated polycarboxylic acid anhydrides and unsaturated polycarboxylic acid lower alkyl esters at a temperature of 150–250° C. in the presence of an organic peroxide to produce modified poly-α-olefin having a saponification number of at least 6, a melt viscosity of 100–5,000 centipoise at 190° C. and an inherent viscosity of about .1 to about .6.

12. A process for the preparation of an emulsifiable low molecular weight crystallizable polypropylene composition which comprises reacting a thermally degraded polypropylene having an inherent viscosity of 0.2 to about 0.5 with a member of the group consisting of unsaturated polycarboxylic acids, unsaturated polycarboxylic acid anhydrides and unsaturated polycarboxylic acid lower alkyl esters at a temperature of about 150–250° C. in the presence of organic peroxide to produce modified polymer having a saponification number of at least 6, a melt viscosity of 100–5,000 centipoise at 190° C. and an inherent viscosity of about .1 to about .6.

13. A process for the preparation of an emulsifiable low molecular weight crystallizable propylene/butene-1- copolymer composition which comprises reacting a thermally degraded propylene/butene-1 copolymer having an inherent viscosity of 0.1 to about 0.5 with a member of the group consisting of unsaturated polycarboxylic acids, unsaturated polycarboxylic acid anhydrides and unsaturated polycarboxylic acid lower alkyl esters at a temperature of about 150–250° C. in the presence of organic peroxide to produce modified polymer having a saponification number of at least 6, a melt viscosity of 100–5,000 centipoise at 190° C. and an inherent viscosity of about .1 to about .6.

14. An emulsifiable low molecular weight modified poly-α-olefin prepared by reacting a thermally degraded poly-α-olefin composition according to the process of claim 9.

15. An emulsifiable low molecular weight modified poly-α-olefin prepared by reacting a thermally degraded poly-α-olefin composition according to the process of claim 10.

16. An emulsifiable low molecular weight modified poly-α-olefin prepared by reacting a thermally degraded poly-α-olefin composition according to the process of claim 11.

17. Emulsions containing the emulsifiable low molecular weight crystallizable modified poly-α-olefin composition prepared by reacting a thermally degraded poly-α-olefin according to the process of claim 9.

References Cited

UNITED STATES PATENTS

| | | | |
|---|---|---|---|
| 2,766,214 | 10/1956 | Erchak et al. | 260—94.9 |
| 2,829,296 | 3/1958 | Guillet | 260—94.9 |
| 2,973,344 | 2/1961 | Fasce | 260—94.9 |
| 2,970,129 | 1/1961 | Rugg et al. | 260—878 |
| 3,267,173 | 8/1966 | Zeitlin | 260—878 |
| 3,290,415 | 12/1966 | Tanner | 260—878 |
| 3,316,231 | 4/1967 | Canterino | 260—94.9 |
| 3,328,362 | 6/1967 | Robert et al. | 260—94.9 |
| 3,341,621 | 9/1967 | Hagemeyer et al. | 260—878 |

MURRAY TILLMAN, Primary Examiner

M. J. TULLY, Assistant Examiner

U.S. Cl. X.R

117—139.4, 161; 204—159.17; 260—88.2, 937, 949, 878

PO-1050
(5/69)

UNITED STATES PATENT OFFICE
CERTIFICATE OF CORRECTION

Patent No. 3,480,580      Dated November 25, 1969

Inventor(s) Frederick B. Joyner and Richard L. McConnell

It is certified that error appears in the above-identified patent and that said Letters Patent are hereby corrected as shown below:

Column 2, line 47, "in" should read ---is---. Column 5, line 70, "propylene1/-pentene" should read ---propylene/1-pentene-- Column 8, line 71, "3-1 carbon atoms" should read ---3-12 carbon atoms---.

SIGNED AND
SEALED
SEP 22 1970

(SEAL)
Attest:

Edward M. Fletcher, Jr.
Attesting Officer

WILLIAM E. SCHUYLER, JR.
Commissioner of Patents